(12) United States Patent
He et al.

(10) Patent No.: US 7,715,867 B2
(45) Date of Patent: May 11, 2010

(54) MOBILE COMMUNICATION TERMINAL AND WIRELESS COMMUNICATION MODULE THEREOF

(75) Inventors: Zhiqiang He, Beijing (CN); Jian Jin, Beijing (CN); Dan Wu, Beijing (CN); Jianguang Wu, Beijing (CN); Jun Zhi, Beijing (CN); Yu Zheng, Beijing (CN); Wei Zhu, Beijing (CN); Zhiqian Ma, Beijing (CN); Hongtao Ma, Beijing (CN); Xinling Wu, Beijing (CN); Yongrong Wang, Beijing (CN); Xinsheng Huang, Beijing (CN); Jiangwei Zhong, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 978 days.

(21) Appl. No.: 10/573,389

(22) PCT Filed: May 8, 2004

(86) PCT No.: PCT/CN2004/000445

§ 371 (c)(1),
(2), (4) Date: Mar. 24, 2006

(87) PCT Pub. No.: WO2005/036906

PCT Pub. Date: Apr. 21, 2005

(65) Prior Publication Data

US 2007/0049338 A1    Mar. 1, 2007

(30) Foreign Application Priority Data

Sep. 26, 2003  (CN) .............................. 03 1 60067

(51) Int. Cl.
*H04B 1/08* (2006.01)

(52) U.S. Cl. ................. 455/550.1; 455/557

(58) Field of Classification Search ............. 455/550.1, 455/557, 558, 575.1, 90.1–90.03; 235/385, 235/492

See application file for complete search history.

(56) References Cited

U.S. PATENT DOCUMENTS 5,373,149 A * 12/1994 Rasmussen .................. 235/492

(Continued)

FOREIGN PATENT DOCUMENTS

CN           1367623          9/2002

(Continued)

OTHER PUBLICATIONS

International Search Report of prior PCT Application No. PCT/CN2004/000445, Jul. 5, 2004.

*Primary Examiner*—Thanh C Le
(74) *Attorney, Agent, or Firm*—Dickstein, Shapiro, LLP.

(57) ABSTRACT

The present invention provides a mobile communication terminal comprising a wireless communication module and a host, wherein the wireless communication module further comprises a first interface connector and a module case; the host reserves positions for the insertion of the wireless communication module, and further comprises a second interface connector corresponding to the first interface connector positioned on the wireless communication module; the wireless communication module is connected to the host via the first interface connector and the second interface connector. The present invention also discloses a wireless communication module which is integrated with a SIM card unit. The present invention can reduce the waste in development and application, and shorten the development period of mobile communication terminals. Thus, the wireless communication module interface is simplified so that the wireless communication module interface is easy to use.

12 Claims, 5 Drawing Sheets

U.S. PATENT DOCUMENTS

| | | | | |
|---|---|---|---|---|
| 5,594,952 | A | * | 1/1997 | Virtuoso et al. ............. 455/557 |
| 6,131,040 | A | | 10/2000 | Knuutila et al. |
| 6,633,759 | B1 | * | 10/2003 | Kobayashi ................. 455/557 |
| 2003/0037191 | A1 | | 2/2003 | Baranowski et al. |

FOREIGN PATENT DOCUMENTS

| | | |
|---|---|---|
| WO | WO 02/078375 | 10/2002 |

* cited by examiner

MOBILE COMMUNICATION TERMINAL AND WIRELESS COMMUNICATION MODULE THEREOF

BACKGROUND OF THE INVENTION

1. Field of the Invention

This present invention relates to a mobile communication terminal and a wireless communication module thereof.

2. Description of Prior Art

As the mobile communication technology is rapidly developing, the mobile communication terminals are provided with a space for great improvement. There are two main implementing solutions for the mobile communication terminals.

One solution integrates the chipsets of the base band and radio-frequency circuits. This solution employs a standard single or double circuit board(s) to integrate the periphery circuits including, for example, keyboard, LCD, SIM card and so on. Generally, mobile phones employ this solution. However, such a solution needs a complex design for radio-frequency and base band circuits and the functions of mobile communication have to be completely and finely tested. There are therefore the disadvantages of significantly increasing the cost of development and manufacture and the elongated development period which are adverse to the speedy renewal of the mobile communication products.

Figure 1:
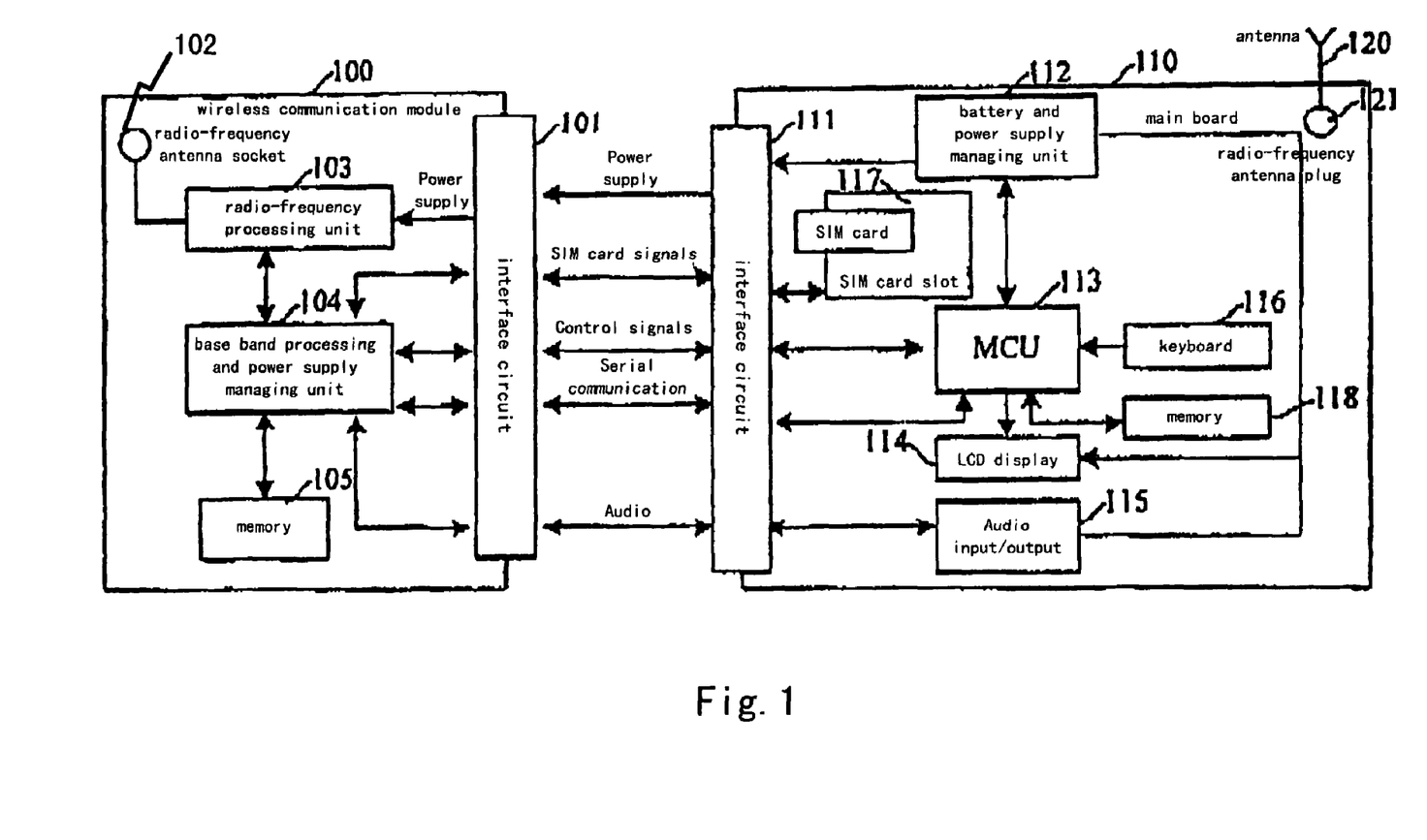
FIG. 1 is a schematic diagram showing the hardware configuration of a PDA for implementing the wireless communication function in a prior art.

The other solution modularizes the wireless communication circuits to design wireless communication modules. The designed modules are welded onto a host. Radio-frequency transmission/reception, base band encoding/decoding and the run of protocol stack are implemented by the stable and mature wireless communication modules. The periphery circuits such as keyboard, LCD, SIM card and the likes perform their control functions through the host. This solution is mainly used in personal information products such as personal digital assistants (PDAs) and notebook computers to perform wireless communication functions, but is rarely used in mobile phones at present. For example, in PDA, the wireless communication module is typically welded onto the main board of the host. Also, in some cases, both the wireless communication modules and the host are directly designed on a single printed board and are connected to each other with interface circuits. Such wireless communication modules are also installed inside the host and do not support plug and play neither. Further, there is no standardization of the interface among different manufacturers. The hardware configuration thereof is shown in FIG. 1 which is a schematic diagram showing the hardware configuration of PDA for implementing the wireless communication functions in a prior art. Herein, a wireless communication module 100 includes a radio-frequency antenna socket 102, a radio-frequency processing unit 103, a base band processing and power supply managing unit 104, a memory 105 and so on. The base band processing and power supply managing unit 104 is connected to the radio-frequency processing unit 103 and the memory 105. The base band processing and power supply managing unit 104, the radio-frequency processing unit 103 and the memory 105 collaborate to perform radio-frequency transmission/reception, base band encoding/decoding and the run of protocol stack. The radio-frequency processing unit 103 and the base band processing and power supply managing unit 104 are connected to an interface circuit 111 of a host 110 through an interface circuit 101. The host 110 mainly includes a battery and power supply managing unit 112, a micro control unit (MCU) 113, a liquid crystal display (LCD) 114, a speaker and a microphone (SPK & MIC) 115, a keyboard 116, a SIM card unit 117, a memory 118, a radio-frequency antenna plug 121, and other parts. The battery and power supply managing unit 112 supplies power to the wireless communication module 100 and the other parts of the host 110. The micro control unit (MCU) 113 controls interface communication to perform foundational functions such as LCD display, keyboard control and charging/discharging management. The liquid crystal display (LCD) 114 displays a man-machine interface and performs information interactivity and controls the operations between the user and the PDA. The speaker and the microphone 115 output and input audio signals. The memory 118 stores host program, ring tones, short messages and phone book. The radio-frequency antenna plug 121 connects a radio-frequency antenna 120. The signals transmitted between the interface circuits 101 and 111 comprise power supply signals, control signals, SIM card signals, data and command signals and audio signals. The data and command signals can be transmitted through a standard serial communication interface.

Figure 2:
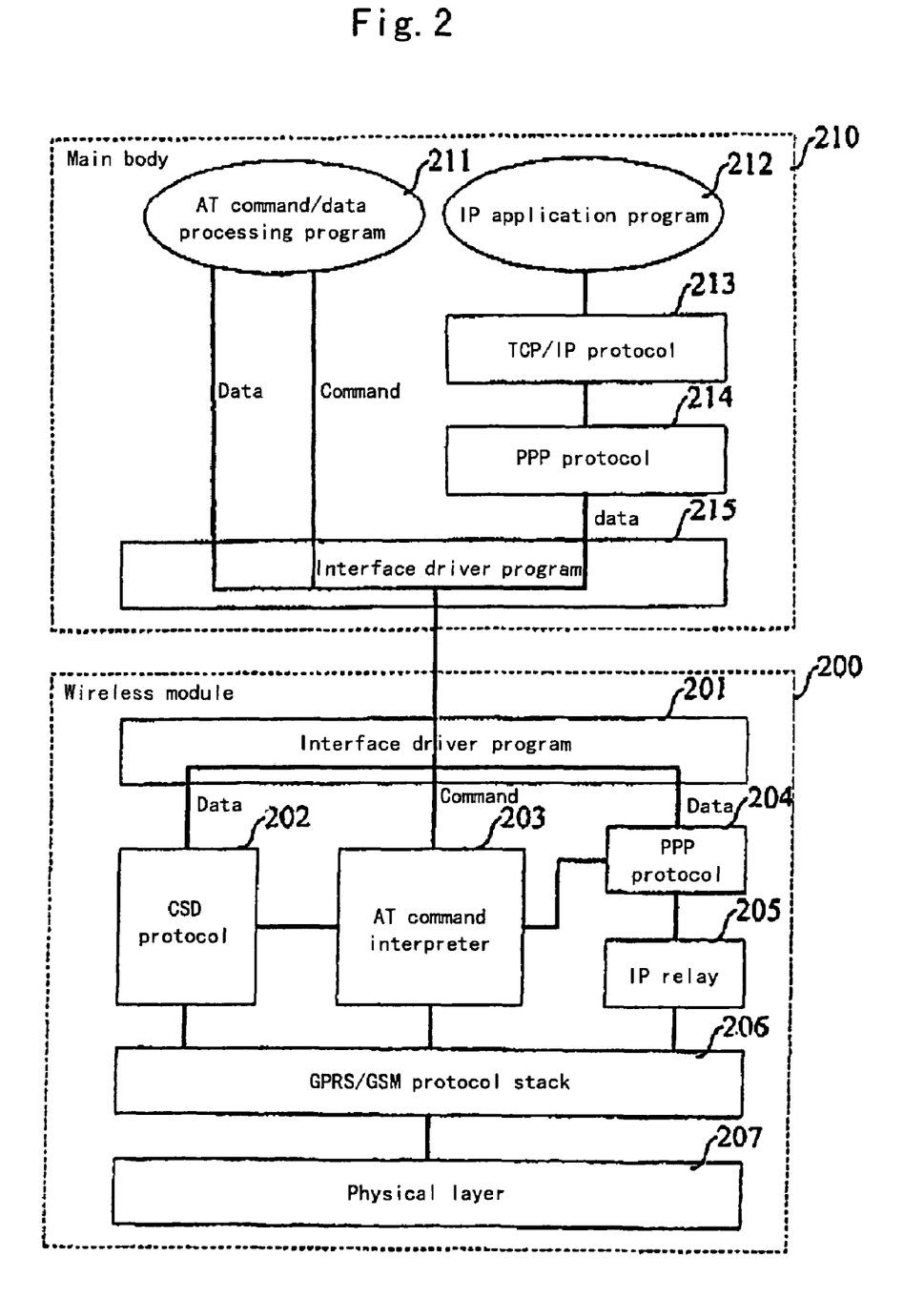
FIG. 2 is a schematic diagram showing the software framework of the PDA for implementing the wireless communication function in a prior art.

FIG. 2 is a schematic diagram showing the software architecture of the PDA for implementing the wireless communication function in prior art. A wireless communication module 200 is composed of software modules such as an interface driver program 201, a CSD protocol 202, an AT command interpreter 203, a PPP protocol 204, an IP relay 205, a GSM/GPRS protocol stack 206 and a physical layer 207. These software programs are stored in the memory 105 of the wireless communication module 200 and executed by the base band processing and power supply managing unit 104 in the wireless communication module 200.

Corresponding to the wireless communication module, the host 210 is composed of software modules such as an AT command/data processing program 211, an IP application program 212, a TCP/IP protocol 213, a PPP protocol 214 and an interface driver program 215. These software programs are stored in the memory 118 of the host 210 and executed by the MCU 113 in the host 210.

In PDAs with the same model, the interface driver program 201 in the wireless communication module 200 corresponds to the interface driver program 215 in the host 210. The PDAs with different models may employ different interfaces. Therefore, the interface driver programs for the PDAs with different models are somewhat different. Typically, the interface is a serial communication interface.

The basic operation flow with the above software architecture is as follows. During the transmission of commands, if an application program on the host side intends to interact with a network, a corresponding message is firstly packaged into an AT command by using the AT command processing program. The packaged message is then sent through the interface driver program. On the side of the wireless communication module, after this module receives the AT command through the interface, the AT command is interpreted into an actual protocol message at the AT command interpreter layer, and then is sent to the protocol stack.

During the transmission of data, the data stream is transparently transmitted between the host side and the side of the wireless communication module though the interface, and is not processed by the AT interpreter layer. The user may select CSD or GPRS for data transmission.

(1) If CSD is selected to transmit data outward, the AT command/data processing program on the host side sends an AT command to request the establishment of a communication link through a serial port. After receiving the AT command through the serial port, the AT command interpreter on the side of the wireless communication module performs corresponding processes, and controls the CSD protocol and the GSM/GPRS protocol to make a connection of the data communication link. After establishing the connection, the AT command interpreter on the side of the wireless communication module then returns the network information to the AT command/data processing program on the host side. Then, the AT command/data processing program may transmit the data.

(2) If GPRS is selected to transmit data outward, similarly, the AT command/data processing program on the host side, the AT command interpreter and the GSM/GPRS protocol on the side of the wireless communication module are responsible for the establishment of a link connection. When the connection is established, the data may be transmitted. The transmission of data is achieved by the IP application program, the TCP/IP protocol, and the PPP protocol of the host and the PPP protocol, the IP relay of the wireless communication module.

This solution provides significant advantage that only the design for the host needs to be modified. That is, it is unnecessary repeatedly to design the radio-frequency (RF) and most of the base band circuits in the mobile communication terminals. Further, the research and development period is shortened so that the manufacturers put new products into market more rapidly. However, since the wireless communication module interfaces produced by different manufacturers are not standardized at present, the development for software and hardware are limited in many aspects.

With the development of mobile phones, more and more functions are being provided, and the performance of the mobile phones is getting better and better. For example, more vivid music, color display screen, more fashionable designs, and multimedia applications are provided. The users are largely motivated to change their mobile phones due to these factors. And thus, a disadvantage common to the above-mentioned two solutions becomes apparent. Since both the wireless communication circuit and the mobile communication module are fixedly welded on the printed board, therefore the mobile phone as a whole is thrown away when a user changes his/her mobile phone due to its housing or additional functions. That is, the wireless communication module which can be repeatedly used is also thrown away, resulting in a great waste of resources.

As to other mobile terminals, since the wireless communication interfaces are not standardized, each mobile terminal is equipped with one wireless communication module, which also results in a waste of resources.

SUMMARY OF THE INVENTION

It is therefore an object of the present invention to provide a mobile communication terminal which is capable of reducing the wastes in the process of development and shortening the development period for mobile communication terminals.

Another object of the present invention is to provide a wireless communication module which is capable of simplifying and standardizing wireless communication module interfaces and is easy to use.

In order to achieve the above objects, according to one aspect of the present invention, it provides a mobile communication terminal comprising a wireless communication module and a host, wherein the wireless communication module includes at least a radio-frequency processing unit, a base band processing and power supply managing unit and a memory; and the host includes at least a micro control unit, a battery and power supply managing unit, an audio input/output unit, an liquid crystal display (LCD) unit and a keyboard, the wireless communication module further comprises a first interface connector and a module case, the wireless communication module is encapsulated in the module case, and an outgoing connecting portion of the first interface connector is arranged to be exposed outside the module case; the first interface connector is connected to the radio-frequency processing unit, and the base band processing and power supply managing unit in the wireless communication module;

the host reserves positions for the insertion of the wireless communication module, and further comprises a second interface connector, which corresponds to the first interface connector on the wireless communication module, positioned at the reserved position, and an outgoing connection portion of the second interface connector is exposed outside the host of the mobile phone; the second interface connector is connected to the micro control unit, the audio input/output unit, and the battery and power supply managing unit in the host respectively; and the wireless communication module is connected to the host via the first interface connector and the second interface connector.

Preferably, the first interface connector may include a first power supply and signal connector for transmitting commands, data, control signals, audio signals and power supply signals, and a first radio-frequency connector for transmitting radio-frequency signals, which are positioned at the two ends of the wireless communication module respectively;

the second interface connector may include a second power supply and signal connector and a second radio-frequency connector which correspond to the first power supply and signal connector and the first radio-frequency connector respectively, and which are positioned at the reserved positions of the two ends of the host and correspond to the first power supply and signal connector and the first radio-frequency connector respectively.

The first power supply and signal connector and the second power supply and signal connector may be a board-to-board connector plug and a board-to-board connector socket respectively.

The board-to-board connector plug and the board-to-board connector socket may respectively be a gold-pin plug and a gold-pin socket which are connected in a form of impaction when the wireless communication module is inserted into the host.

The second power supply and signal connector may further include a snap-close for locking the wireless communication module while the wireless communication module is inserted into the host.

The first radio-frequency connector may be a radio-frequency socket, the second radio-frequency connector may be a radio-frequency plug; and the radio-frequency plug is directly spliced with the radio-frequency socket, or is connected to the radio-frequency socket in the form of impaction, or is connected to the radio-frequency socket through a radio-frequency cable.

The radio-frequency socket may be connected to the radio-frequency processing unit within the wireless communication module, and the radio-frequency plug may be connected to an existing radio-frequency antenna within the host.

The wireless communication module may further include an external radio-frequency antenna which connects with a radio-frequency plug, the radio-frequency socket is connected to the radio-frequency processing unit within the wireless communication module, and the external radio-frequency antenna is connected to the radio-frequency socket through the radio-frequency plug.

The first power supply and signal connector and the second power supply and signal connector may include a standard RS232 serial communication interface for transmitting commands and data.

The wireless communication module may further include a SIM card unit connected to the base band processing and power supply managing unit.

The module case may be a shielding case.

According to another aspect of the present invention, it provides a wireless communication module comprising at least a radio-frequency processing unit, a base band processing and power supply managing unit and a memory;

the wireless communication module further comprises a SIM card unit connecting to the base band processing and power supply managing unit, and a first interface connector connecting the radio-frequency processing unit and the base band processing and power supply managing unit within the wireless communication module.

Herein, the first interface connector may include a first power supply and signal connector, and a first radio-frequency connector for transmitting radio-frequency signals, which are positioned at the two ends of the wireless communication module respectively so that the interference caused by the radio-frequency signals on other signals can be reduced.

The first power supply and signal connector may include a power supply interface, a system control interface, a serial communication interface and an audio interface.

The first radio-frequency connector may be a radio-frequency socket.

The wireless communication module may further include an external radio-frequency antenna which connects with a radio-frequency plug, the radio-frequency socket is connected to the radio-frequency processing unit within the wireless communication module, and the external radio-frequency antenna is connected to the radio-frequency socket through the radio-frequency plug.

The radio-frequency plug may be directly inserted into the radio-frequency socket, or may be connected to the radio-frequency socket in a form of impaction, or may be connected to the radio-frequency socket through a radio-frequency cable.

The wireless communication module may further include a module case. The wireless communication module is encapsulated in the module case, and an outgoing connecting portion of the first interface connector is exposed outside the module case.

The module case may be a shielding case.

In the light of the technical solution of the present invention, the mobile communication terminal according to the present invention makes the wireless communication module separate therefrom, and thus makes the wireless communication function optional to the mobile communication terminal. The waste in development and application can be reduced. Thus, the development period of the mobile communication terminals is shortened. The SIM card unit is integrated within the wireless communication modules so that it is not necessary for the host side to use the SIM card unit. Further, there is no need to separately transmit SIM card signals between the wireless communication module and the host. Thus, the wireless communication module interface is simplified so that the wireless communication module interface is easy to use.

BRIEF DESCRIPTION OF THE DRAWINGS

The above and other objects, features and advantages of the present invention will be apparent with the following descriptions of the preferred embodiments of the present invention in conjunction with the accompanying drawings, in which.

DETAILED DESCRIPTION OF PREFERRED EMBODIMENTS

For making the objects, technical solutions and advantages of the present invention more clear and apparent, the present invention is further described in conjunction with the embodiments and with reference to the drawings in details as below.

The mobile communication terminal according to the present invention employs the software architecture as shown in FIG. 2. A wireless communication module includes an interface connector and is encapsulated in a module case. A host of the mobile communication terminal reserves positions for the insertion of the wireless communication module and a second interface connector corresponding to the interface connector included in the wireless communication module is located on one of the reserved position. The wireless communication module is thus made separated and thus the wireless communication function is optional to the mobile communication terminals.

The wireless communication module of the present invention includes a SIM card unit. Thus, the wireless communication module interface is simplified so that the wireless communication module interface is easy to use.

Figure 3:
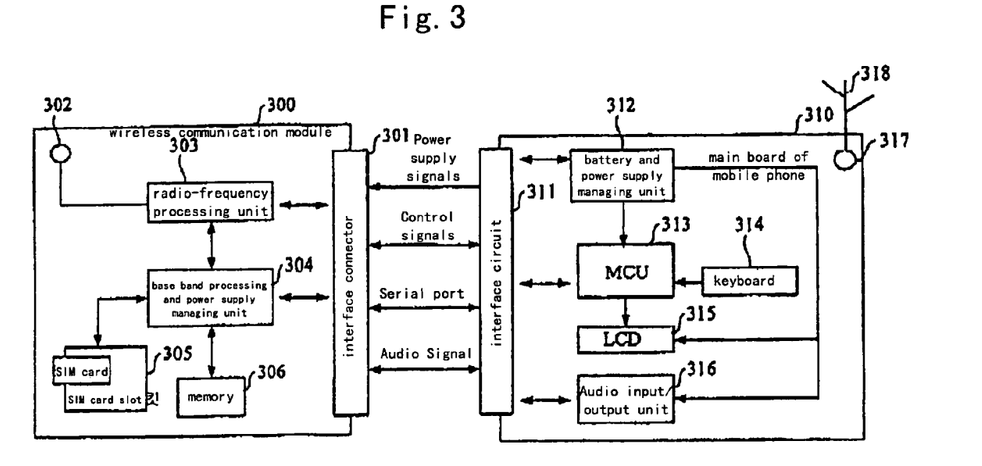
FIG. 3 is a schematic diagram showing the hardware configuration of the mobile terminal according to a first preferred embodiment of the present invention.

Referring to FIG. 3, it is a schematic diagram showing the hardware configuration of a first preferred embodiment of the mobile terminal according to the present invention. The mobile terminal of the present embodiment may be, for example, a mobile phone in which the wireless communication module is the one according to the present invention. The host and the wireless communication module adopt the software architecture as shown in FIG. 2.

In the present embodiment, the wireless communication module 300 includes a radio-frequency connecting socket 302, a radio-frequency processing unit 303, a base band processing and power supply managing unit 304, a memory 306, a SIM card unit containing a SIM card and a SIM card slot, a power supply and signal connector 301. The radio-frequency connecting socket 302 is connected to the radio-frequency processing unit 303. The power supply and signal connector 301 is connected to the radio-frequency processing unit 303 to receive the power supplied by a main board 310 of the mobile phone. The power supply and signal connector 301 is also connected to the base band processing and power supply managing unit 304 to receive a power-on or power-off signal sent by the main board 310 of the mobile phone, a reset signal for resetting the wireless communication module 300. The power supply and signal connector 301 transmits a wake-up signal, commands and data signals, audio signals between the wireless communication module 300 and the main board 310 of the mobile phone. The SIM card unit 305 is connected to the base band processing and power supply managing unit 304.

The host of the mobile phone includes a micro control unit 313, a battery and power supply managing unit 312, an audio input/output unit 316, an LCD display unit 315, a keyboard 314, a power supply and signal connector 311, a radio-frequency connecting plug 317 and an antenna 318. The radio-frequency connecting plug 317 is directly connected to the antenna 318. The power supply and signal connector 311 is connected to the micro control unit 313, the audio input/output unit 316 and the battery and power supply managing unit 312 in the host of the mobile phone respectively.

The wireless communication module 300 is connected to the main board 310 of the mobile phone through the power supply and signal connector 301, the power supply and signal connector 311, the radio-frequency connecting socket 302 and the radio-frequency connecting plug 317. The power supply and signal connectors 301 and 311 may be a board-to-board connector socket and a board-to-board connector plug respectively.

Herein, the power supply and signal connector 301 and the power supply and signal connector 311 are paired interface connectors. The radio-frequency connecting socket 302 and the radio-frequency connecting plug 317 are also paired interface connectors. These two pairs of connectors may be combined into a single pair of interface connectors. This combination might result in the interferences of the radio-frequency signals to the audio signals, so the present invention separates them from each other.

Figure 4:
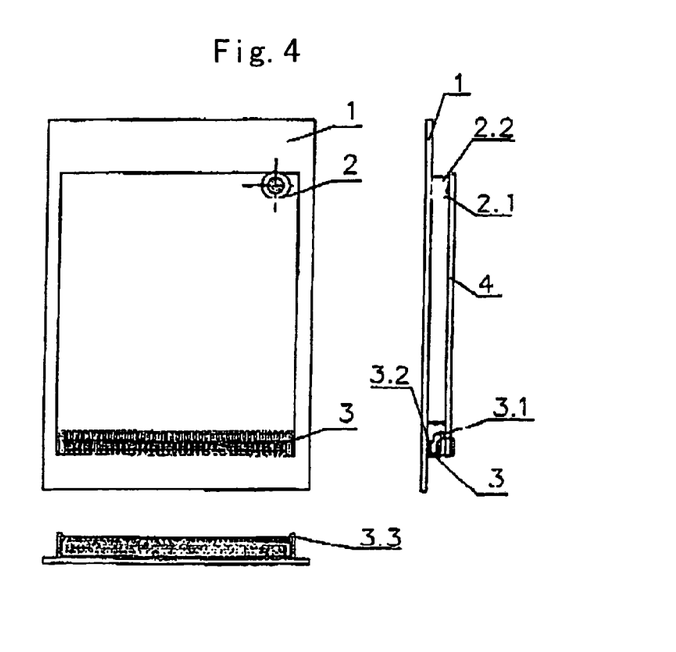
FIG. 4 is a mechanical diagram showing the connection between the wireless communication module and the host.

Referring now to FIG. 4, it is a schematic diagram showing the connection between the wireless communication module and the host. In FIG. 4, 1 denotes a printed circuit board (PCB) of the host of the mobile phone, 2 denotes a radio-frequency connector, 3 represents a power supply and signal connector, and 4 denotes a PCB board of the wireless communication module. As shown in FIG. 4, in the present embodiment, the PCB board 4 of the wireless communication module contains a power supply and signal connector 3.1 and a radio-frequency connector 2.1 respectively located on two ends of the PCB board 4 of the wireless communication module. Needless to say, the power supply and signal connector 3.1 and the radio-frequency connector 2.1 can be positioned on left and right ends or upper and lower ends respectively, as long as they may keep a certain distance therebetween to avoid the interferences of the radio-frequency circuits on the audio signals.

The PCB board of the host of the mobile phone also contains another power supply and signal connector 3.2 and another radio-frequency connector 2.2. The power supply and signal connector 3.2 and radio-frequency connector 2.2 are positioned at the reserved position of the host and correspond to the power supply and signal connector 3.1 and the radio-frequency connector 2.1 positioned at the two ends of the host of the mobile phone respectively. The outgoing connecting portions are exposed outside the mobile phone host.

In the present embodiment, as shown in FIG. 4, the power supply and signal connector 3.2 contains a snap-close 3.3 used for locking the wireless communication module. The power supply and signal connector 3.2 can electrically connect the power supply and signal connector 3.1 without applying external forces when they engage with each other.

In the present embodiment, the wireless communication module 300 includes a shielding module case and is encapsulated in the module case. The outgoing connecting portions of the power supply and signal connector 3.1 and the radio-frequency connector 2.1 are exposed outside the module case.

The power supply and signal connector 3.1 and 3.2 are a gold-pin plug and a gold-pin socket respectively, and are connected in a form of impaction when the wireless communication module is inserted in the host of the mobile phone.

The radio-frequency connector 2.1 may be a radio-frequency socket, and the radio-frequency connector 2.2 may be a radio-frequency plug. The radio-frequency plug 2.2 is directly spliced with the radio-frequency socket 2.1, or is connected to the radio-frequency socket 2.1 in a form of impaction, or is connected to the radio-frequency socket 2.1 through a radio-frequency cable.

The radio-frequency socket 2.1 is connected to the radio-frequency processing unit in the wireless communication module. In additional, the radio-frequency socket 2.1 connects the antenna on the host of the mobile phone when the wireless communication module is inserted into the host of the mobile phone.

The power supply and signal connector 3.1 and the power supply and signal connector 3.2 of the present embodiment include a power supply interface, a system control interface, a serial communication interface and an audio interface, as indicated in the following Table 1.

TABLE 1

| Interface Name | Functions | Signal line name | Notations |
|---|---|---|---|
| power supply interface | power supplying | power supply signal line ground line | |
| system control interface | transmission of control commands | power-on control signal line | Power-on or power-off |
| | | Reset control signal line | resetting wireless communication module |
| | | wake-up signal line | Mutual waking-up of wireless communication module and terminal |
| UART interface | Serial communication | RXD0 TXD0 CTS RTS DSR DTR | Used as AT command and standard modem interface |

TABLE 1-continued

| Interface Name | Functions | Signal line name | Notations |
|---|---|---|---|
| | | RI | |
| | | CD | |
| | | RXD1 | Used as debug or tracing code of |
| | | TXD1 | wireless communication module |
| Ground line (optional) | | GND | |
| Audio interface | Audio signals input and output | SPKP SPKN GND MICP MICN GND | Audio interface providing differential signals for external microphones and speakers |

Herein, the battery and power supply managing unit in the host of the mobile phone supplies power to the wireless communication module via the power supply interface. The system control interface receives the power-on or power-off signal from the host of the mobile phone and the reset signal for resetting the wireless communication module and transmits control signals such as the mutual wake-up signals between the wireless communication module and the host of the mobile phone. The serial communication interface may be a standard RS232 serial communication interface and transmits/receives AT commands and data signals between the wireless communication module and the mobile phone host to perform the functions such as system configuration, voice setup. The audio interface transmits the audio signals between the audio input/output unit of the host of the mobile phone and the base band processing and power supply managing unit included in the wireless communication module.

Figure 5:
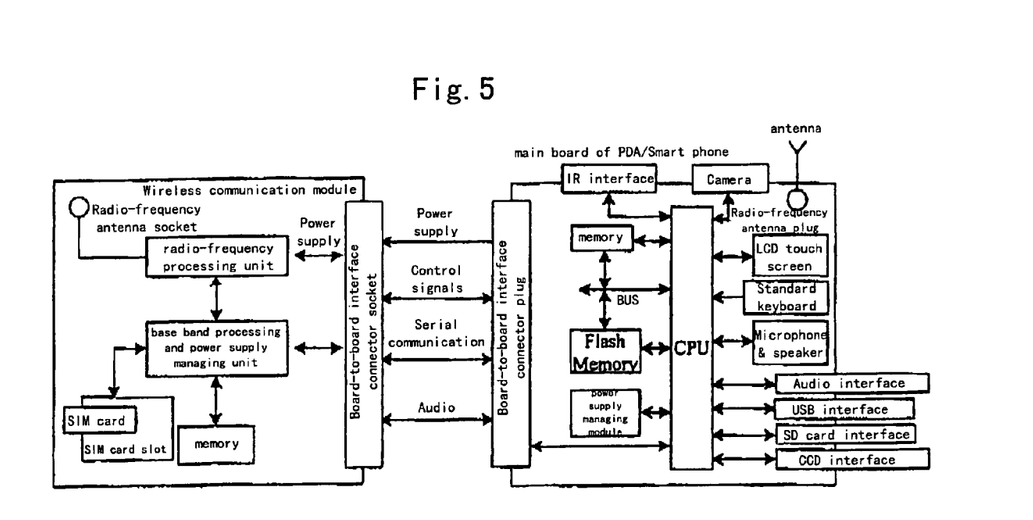
FIG. 5 is a schematic diagram showing the hardware configuration of the mobile terminal according to a second preferred embodiment of the present invention.

Referring now to FIG. 5, it is a schematic diagram showing the hardware configuration of the mobile terminal according to a second preferred embodiment of the present invention. The mobile terminal in the second embodiment may be a PDA or a Smart Phone. The host and the wireless communication module in the present embodiment also employ the software architecture as shown in FIG. 2, and the wireless communication module is the same as that shown in FIG. 3.

Figure 6:
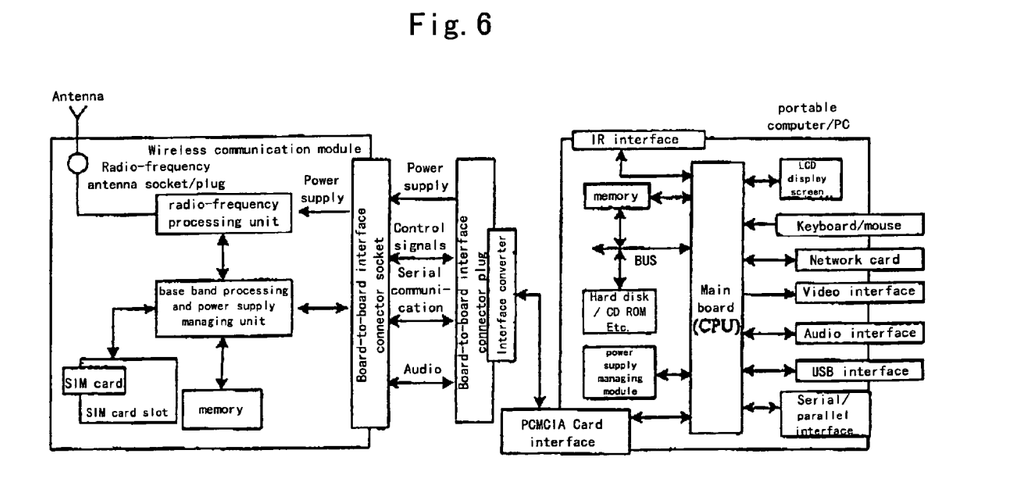
FIG. 6 is a schematic diagram showing the hardware configuration of the mobile terminal according to a third preferred embodiment of the present invention.

FIG. 6 is a schematic diagram showing the hardware configuration of the mobile terminal according to a third preferred embodiment of the present invention. The mobile terminal in the third embodiment may be a portable computer/PC. The host and the wireless communication module in this embodiment can also employ the software architecture as shown in FIG. 2. Based on this software architecture, a wireless communication software module is added to the operation system of the portable computer/PC to obtain the functions such as recognition, drive and control of the operation system to the module.

Because the portable computer/PC is usually only provided with standard interfaces, it is necessary to convert a non-standard interface into a standard interface before connecting when a hardware function module with the non-standard interfaces is added. Therefore, in the present embodiment, a dedicated interface converter or an interface conversion line is used. The wireless communication module is connected to a PCMCIA card of the portable computer/PC through the interface converter. The interface converter converts the signal levels, operation voltages and so on.

As shown in FIG. 6, in the present embodiment, the radio-frequency antenna is provided on the wireless communication module. The antenna can be directly installed onto the module through the radio-frequency antenna plug/socket because the portable computer/PC is not equipped with a radio-frequency antenna normally. Whether it is necessary to provide a radio-frequency cable between the radio-frequency plug and socket or not may be decided based on the distance between the antenna and the antenna socket.

Figure 7:
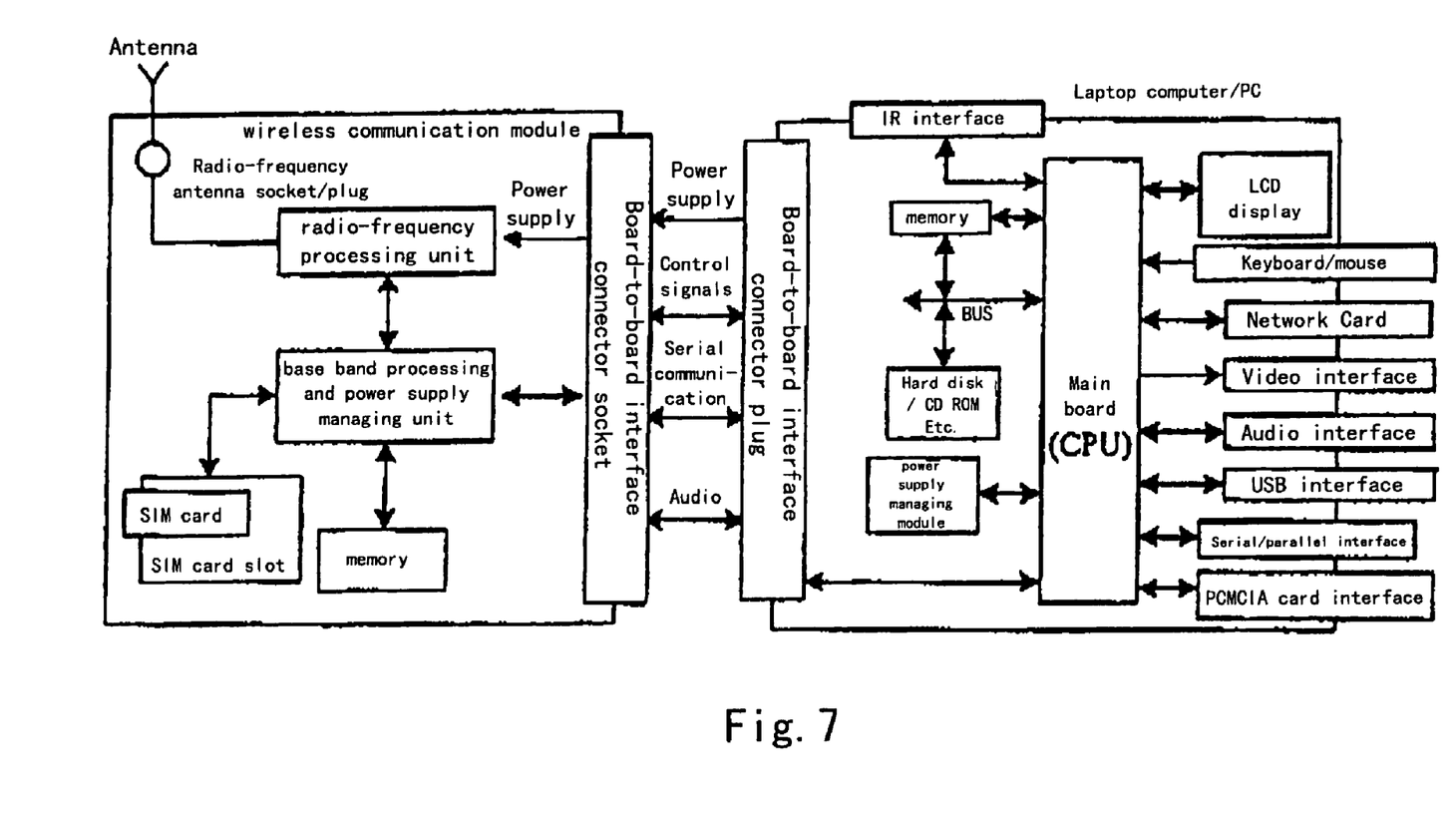
FIG. 7 is a schematic diagram showing the hardware configuration of the mobile terminal according to a fourth preferred embodiment of the present invention.

FIG. 7 is a schematic diagram showing the hardware configuration of the mobile terminal according to a fourth preferred embodiment of the present invention. The mobile terminal of the present embodiment is same as the mobile terminal in the third preferred embodiment as shown in FIG. 6 except that a board-to-board connecting plug is added as a dedicated wireless communication interface into the portable computer/PC. Further, the wireless communication module and the radio-frequency antenna are integrated into a case, and can be directly spliced onto the portable computer/PC as a standard hardware function module without external interface conversion.

As it is apparent from the above embodiments, the wireless communication module can be separated from mobile communication terminal so that the wireless communication functions of the mobile communication terminal can be selectable. The waste in development and application can be reduced. The development period of mobile communication terminals is shortened. The SIM card unit is integrated with the wireless communication module so that it is not necessary to transmit SIM card signals between the wireless communication module and the host. Thus, the wireless communication module interface is simplified so that the wireless communication module interface is easy to use.

According to the present invention, for a user of a mobile phone, if only the housing of the mobile phone is not satisfactory, then it is only necessary to change the housing of the mobile phone. If both the functions and housing of the mobile phone need to be changed, then the user can change only the host with MCU applications. It is unnecessary to change the software and hardware of the mobile communication portion. The wireless module can be used in a form of plug and play. The cost for the users' personalized selections can be reduced.

In the process of developing mobile phones, the difficult problems in development for high frequency portion of the prior mobile phone can be ignored. And thus, the degree of freedom for designing the PCB and structure of the mobile phone is increased. Therefore, the mobile phones will be greatly changed, thereby facilitating the personalization of the mobile phone designs and reducing the costs of manufacturing and repairing.

The general wireless communication modules can achieve a real plug and play, and can be used to any information devices such as mobile phones, PDAs/Smart Phones, portable computers/PCs and the like which need wireless communication function. According to the present invention, further, the costs for applications can also be reduced.

What is claimed is:

1. A mobile communication terminal comprising a wireless communication module including at least a radio-frequency processing unit, a base band processing and power supply managing unit and a memory; and a host including at least a micro control unit, a battery and power supply managing unit, an audio input/output unit, a liquid crystal display (LCD) unit and a keyboard, wherein the wireless communication module further comprises a first interface connector connecting the radio-frequency processing unit, and the base band processing and power supply managing unit in the wireless communication module, and a module case in which the wireless communication module is encapsulated, wherein the first interface connector has an outgoing connecting portion exposed outside the module case;

the host has reserved positions for the insertion of the wireless communication module, and a second interface connector connecting the micro control unit, the audio input/output unit, and the battery and power supply managing unit in the host respectively and has an outgoing connection portion exposed outside the host of the mobile phone, wherein the second interface connector is positioned at the reserved positions and corresponds to the first interface connector on the wireless communication module; and the wireless communication module is connected with the host via the first interface connector and the second interface connector.

2. The mobile communication terminal according to claim 1, wherein the first interface connector includes a first power supply and signal connector for transmitting commands and data, control signals, audio signals and power supply signals, and a first radio-frequency connector for transmitting radio-frequency signals, the first power supply and signal connector and the first radio-frequency connector are positioned at the two ends of the wireless communication module respectively;

the second interface connector includes a second power supply and signal connector and a second radio-frequency connector corresponding to the first power supply and signal connector and the first radio-frequency connector respectively, the second power supply and signal connector and the second radio-frequency connector are positioned at the reserved positions of the two ends of the host and correspond to the first power supply and signal connector and the first radio-frequency connector respectively.

3. The mobile communication terminal according to claim 2, wherein the first power supply and signal connector and the second power supply and signal connector are a board-to-board connector plug and a board-to-board connector socket respectively.

4. The mobile communication terminal according to claim 3, wherein the board-to-board connector plug and the board-to-board connector socket are a gold-pin plug and a gold-pin socket respectively which are connected in a form of impaction when the wireless communication module is inserted into the host.

5. The mobile communication terminal according to claim 2, wherein the second power supply and signal connector further comprises a snap-close for locking the wireless communication module while the module is inserted into the host.

6. The mobile communication terminal according to claim 2, wherein the first radio-frequency connector is a radio-frequency socket, the second radio-frequency connector is a radio-frequency plug, the radio-frequency plug is directly spliced with the radio-frequency socket, or is connected to the radio-frequency socket in a form of impaction, or is connected to the radio-frequency socket through a radio-frequency cable.

7. The mobile communication terminal according to claim 6, wherein the radio-frequency socket connects the radio-frequency processing unit within the wireless communication module, and the radio-frequency plug connects a radio-frequency antenna within the host.

8. The mobile communication terminal according to claim 6, wherein the wireless communication module further comprises an external radio-frequency antenna which connects a radio-frequency plug, the radio-frequency socket connects the radio-frequency processing unit within the wireless communication module, and the external radio-frequency antenna connects the radio-frequency socket through the radio-frequency plug.

9. The mobile communication terminal according to claim 2, wherein the first power supply and signal connector and the second power supply and signal connector each includes a standard RS232 serial communication interface for transmitting commands and data.

10. The mobile communication terminal according to claim 1, wherein the wireless communication module further includes a SIM card unit connecting the base band processing and power supply managing unit.

11. The mobile communication terminal according to claim 1, wherein the module case is a shielding case.

12. A wireless communication terminal comprising:

a wireless communication module including at least a radio-frequency processing unit, a base band processing and power supply managing unit and a memory; and a host including at least a micro control unit, a battery and power supply managing unit, an audio input/output unit, a liquid crystal display (LCD) unit and a keyboard, wherein the wireless communication module further comprises a first interface connector connecting the radio-frequency processing unit, and the base band processing and power supply managing unit in the wireless communication module, and a module case in which the wireless communication module is encapsulated, wherein the host has reserved positions for the insertion of the wireless communication module, and a second interface connector connecting the micro control unit, the audio input/output unit, and the battery and power supply managing unit in the host respectively, wherein the second interface connector is positioned at the reserved positions and corresponds to the first interface connector on the wireless communication module, wherein said wireless communication module detachably connects the host via the first interface connector and the second interface connector.

* * * * *